Feb. 28, 1967  F. C. SERENO ETAL  3,306,443
VACUUM ASPIRATOR MECHANISM WITH CONICAL BARRIER ELEMENT
Filed Feb. 19, 1964  2 Sheets-Sheet 2
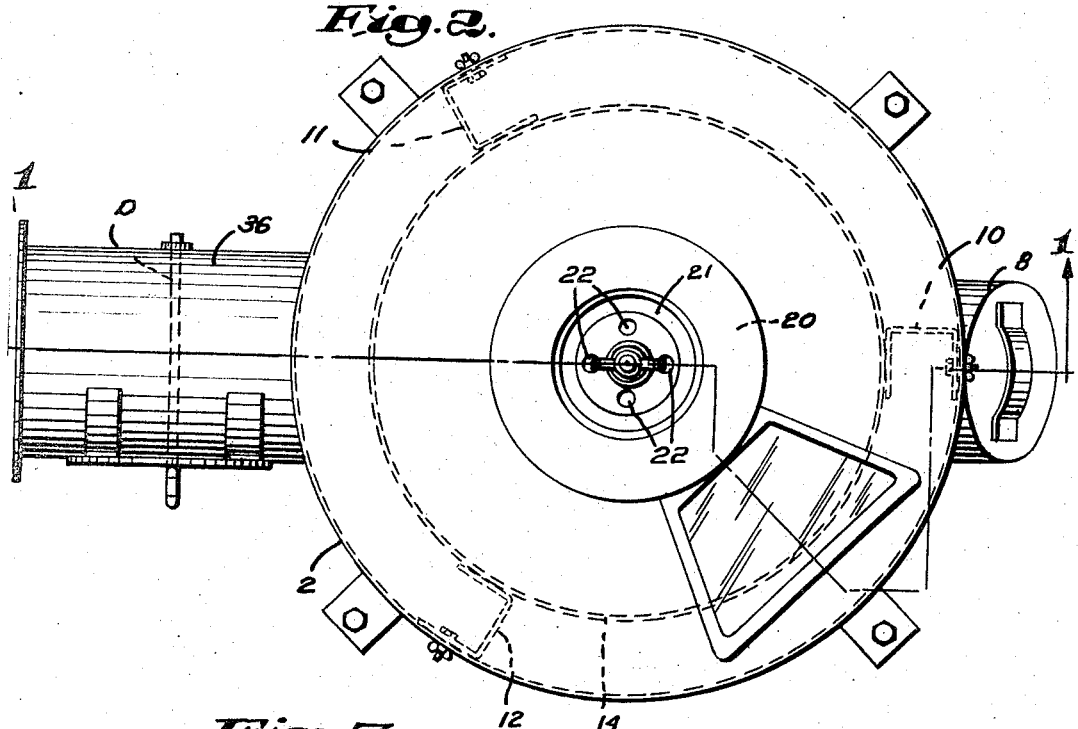
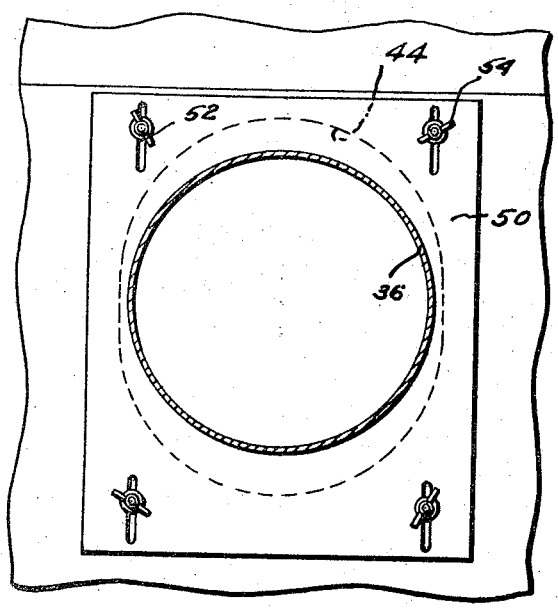
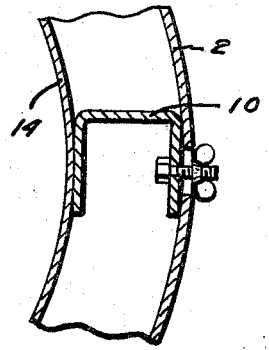
Inventors:
Austin T. Drake
Frank C. Sereno
Alfred T. Glynn
by Munro H. Hamilton
Attorney

United States Patent Office 3,306,443
Patented Feb. 28, 1967

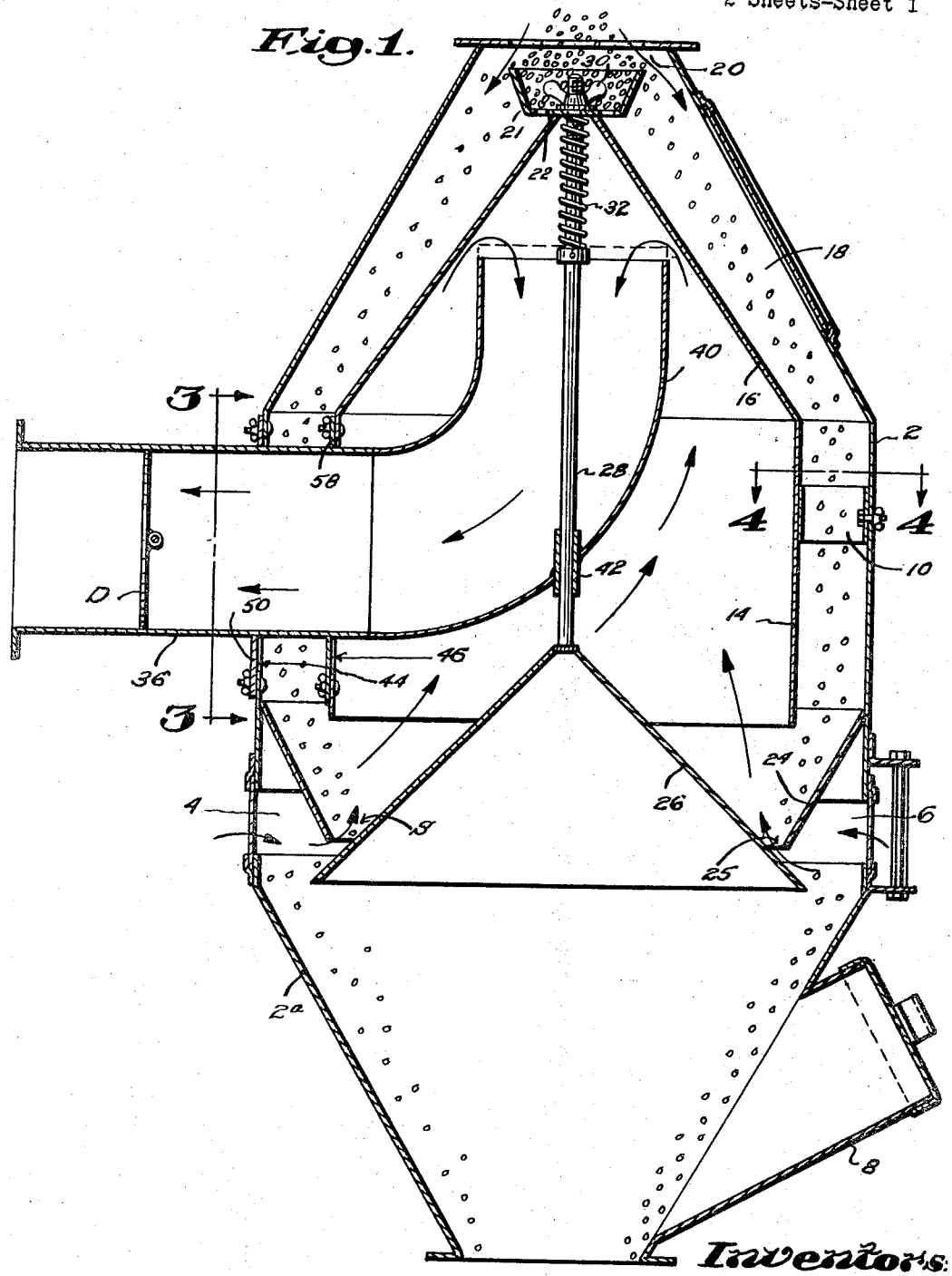

3,306,443
VACUUM ASPIRATOR MECHANISM WITH CONICAL BARRIER ELEMENT
Frank C. Sereno, Stoughton, and Alfred T. Glynn, North Quincy, Mass., and Austin T. Drake, Fostoria, Ohio, assignors to Sturtevant Mill Company, Dorchester, Mass., a corporation of Massachusetts
Filed Feb. 19, 1964, Ser. No. 345,970
3 Claims. (Cl. 209—136)

This invention relates to a method and apparatus for treating finely divided materials and, more particularly, to a machine for aspirating and purifying grains of the class including wheat, corn, rye, oats, barley, and the like.

In handling and processing substances such as the class of grains noted, difficulty is experienced in separating and removing from the grain extremely light particles such as grain hulls, dust and other foreign matter without a significant loss of the grain itself. It has been proposed in the art to treat grains with certain types of aspirator devices for purifying and removing dirt and foreign material as disclosed, for example, in Patent No. 1,445,760. However, removal of grain hulls and certain fine dust-like particles cannot be carried out to the fullest extent desired and there exists a need for more precisely controlling the processing of certain types of grains in order to extract grain hulls and similar substances and meet required customer specifications.

A chief object of the invention is to provide an improved method of removing grain hulls and dust from grains and in this connection we have discovered an improved aspirating method by means of which a more selective control of aspirating action is realized and a greatly improved removal of certain very light materials such as grain hulls may be accomplished without excessive loss of the usable grain portions.

Another more specific aspect is to provide an improved aspirator type apparatus for inducing a suction force which may be exerted all the way around an annular space in a highly selective manner.

Another object is to provide in combination with an aspirator apparatus an adjustable duct regulating mechanism by means of which the path of flow of aspirating air may be variably controlled in a desirable manner.

Other objects and novel features will be more fully understood and appreciated from the following description of a preferred embodiment of the invention selected for purposes of illustration and shown in the accompanying drawings, in which:

FIGURE 1 is a vertical cross sectional view taken approximately centrally of the aspirator apparatus of the invention;

FIGURE 2 is a plan view of the machine shown in FIGURE 1;

FIGURE 3 is a cross section taken on the line 3—3 of FIGURE 1 and indicating a portion of the machine side in elevation in which an adjustable air conduit is mounted; and FIGURE 4 is a detail cross section taken approximately on the line 4—4 of FIGURE 1.

In general, the structure disclosed is intended to constitute one preferred embodiment of means for carrying out a novel aspirating of finely divided materials such as grains, and the invention although not limited to the treatment of grains is hereinafter described with specific reference to aspirating grains such as peas, corn and the like which are characterized by outer hulls or exterior coverings of very light material and required to be removed in accordance with certain customer specifications.

The essential steps which are followed in carrying out the method of the invention include producing an annularly cascading flow of grain particles, causing a suction induced flow of air to pass upwardly through the cascading grain particles at predetermined points to remove and lift upwardly a fraction of relatively light grain particles including particles of matter such as grain hulls, dust particles, and the like. The grain particles and hulls thus separated and removed from the cascading stream are conducted upwardly into a conical barrier element and moved through an aspirating orifice along an abruptly reversing path of travel to a point of discharge. The aspirating orifice is comprised on one side by the apex portion of the conical barrier element and on the other side by a specially formed suction pipe extremity. By means of this arrangement a very high degree of selectivity with respect to very light particles such as hulls may be realized and a very large percentage of the relatively heavier grain particles are deflected or rejected.

In the structure shown in the drawings, numeral 2 denotes an outer casing member which is formed at its lower end with air ducts as 4 and 6 through which air may be drawn into the casing. The casing is further provided with a converging bottom part 2a which constitutes a particle outlet and which may be open as shown or closed by a suitable cover member. Numeral 8 indicates an access tube for allowing an operator to reach into the casing when this is desirable for one reason or another.

Secured at the inside of the casing 2 are U-brackets as 10, 11 and 12, better shown in FIGURE 2. These brackets support a cylindrical skirt portion 14 of a conical barrier element 16 in spaced relation to the inner surfaces of the casing 2 to thereby define an annular passageway 18.

Finely divided materials such as grain particles to be classified or separated are introduced through a feed inlet member 20 at the top of casing 2 and cascade into a collector member to fill and overflow this member so that particles spill over and become distributed all around the annular passageway 18. Material left in collector 21 is discharged through holes 22. Suspended from the top of the conical barrier element 16 is a rod 28 at the lower end of which is a conical deflector member 26. The rod 28 is threaded at its upper end and secured through the bottom of feed inlet 20 by a fastening such as a wingnut 30. A spring 32 cooperates with the wingnut in vertically adjusting the deflector as desired and this vertical adjustment of the deflector bottom 26 opens and closes a space S between itself and inwardly projecting sides 24 on casing 2 thus forming a restricted passageway 25 through which grain from annular passageway 18 is passed.

In accordance with the invention, we provide in combination with the conical barrier element 16 a vertically adjustable suction pipe member which consists of a tubular body 36 whose outer end is connected to a suction pump of some conventional nature and not shown in the drawings The suction member 36, as shown in FIGURE 1, is transversely located through one side of the casing 2 and also through the cylindrical skirt portion 14 of the conical barrier. At its inner extremity the suction member is curved upwardly to provide an elbow portion 40 as noted in FIGURE 1. The upper end of the elbow portion 40 is arranged to terminate in close proximity to the apex of the conical barrier to form an aspirating orifice which can be controlled in size very precisely by moving the elbow towards and away from the barrier apex. In thus raising or lowering the elbow portion 40, we provide for sliding movement of an elbow bearing 42 on the rod 28 of deflector 26. We further provide in the casing 2 an elongated slot 44 which is more clearly shown in FIGURE 3. Also provided is a similar slot 46 in skirt 14. The slots in each instance are substantially greater in size than the diameter of the suction member so as to provide a desired amount of vertical adjustment. To close the space between the member 36 and the edge of slot 44, we secure around the pipe 36 a sealing flange 50 which is adjustably secured against the casing 2 by fastening 52, 54, etc. Similarly, a sealing flange 58 closes the space between the pipe 36 and the elongated slot 46 of skirt 14.

It will be observed that as the suction elbow portion 40 is moved towards the converging sides of the barrier member 16, the spacing between the upper extremity of the elbow 40 and adjacent surfaces of the barrier element grows very small. Thus there is formed an extremely small confined space at the apex of the barrier element 16 and a narrow aspirating orifice which is highly selective.

In operation assuming that it is desired to process a type of grain of the class indicated and remove grain hulls, the suction apparatus is started to provide for a flow of air into the air ducts 4 and 6 and upwardly through the restricted passageway 25 towards the top of the conical barrier 16.

Thereafter, grain particles are delivered to the feed inlet 20 by means of a conveyor screw or other suitable means. The grain particles cascade downwardly along the annular passageway 18 into the restricted passageway 25. At this point most of the relatively heavy particles pass through the passageway 25 while a small fraction of relatively light grain particles, hulls and dirt, are lifted upwardly by the suction apparatus towards the conical barrier 16. The fraction of particles thus retained continue upwardly and most of these particles move into contact with the barrier 16 and tend to become deflected inwardly and downwardly. However, a few of the lifted particles of extremely light nature consisting of grain hulls and the like are drawn still further upwardly and pass into the aspirator orifice where their path of travel is abruptly reversed and directed out of the suction pipe.

It will be apparent that the combination of the elbow and conical barrier cooperate to confine air flowing upwardly into the apex of the barrier and such air is then trapped and turned back and drawn down into the suction pipe. The effect of this, we find, is to set up a small very sharply defined area into which only very light particles may enter and most of the lifted material is deflected and thrown downwardly. There is thus provided a method and means of separating very light particle material from the rest of the grain particles without loss of efficiency.

It is also pointed out that a highly desirable control of the orifice size and hence the flow of air may be realized by adjusting the position of the elbow 40 relatively to the barrier 16. The flow of air removed may also be regulated by a damper member D in member 36, and a still further control may be realized at the air ducts 6 and by changing the position of the deflector 26 to increase or decrease passageway 25.

It is intended that the structure disclosed may be embodied in other modified forms within the scope of the appended claims.

We claim:

1. A machine of the class described comprising an outer casing member having an upper grain inlet formed at the top thereof and a bottom grain outlet and air ducts formed at the bottom thereof, a conically shaped barrier element having a cylindrical skirt portion supported in spaced relation to the inner side walls of the casing to define an annular passageway for conducting grain from the grain inlet downwardly through the casing towards the grain outlet, a deflector member and a rod element adjustably suspended from the conically shaped barrier element for supporting said deflector in spaced relation to inner sidewall portions of the casing member to provide a restricted air passageway through which grain from the said annular passageway is caused to pass, suction pipe means transversely located through the side of the casing and the cylindrical skirt element of the barrier portion and vertically adjustable on said rod element for inducing a flow of air from the said air ducts upwardly through the restricted air passageway whereby particles of grain and grain hulls approaching the restricted passageway are travelled inwardly and upwardly into the area enclosed by the conical barrier element and said suction pipe means having an inner extremity curved upwardly to provide an elbow portion which terminates in close proximity to the apex of the conically shaped barrier element and which forms an annular orifice through which relatively light grain hulls may be selectively removed while relatively heavier grain particles are rejected.

2. A structure as defined in claim 1 in which the said casing and the inner skirt portion are formed with elongated apertures for permitting vertical displacement of the suction pipe means therein, and sealing flange portions fixed to the suction pipe means for closing the space between the suction pipe means and adjacent elongated opening in the casing and skirt portion.

3. An aspirator apparatus for processing finely divided grain products including an outer casing formed at the bottom with air ducts, an inlet opening at the upper side thereof for introducing particles of material for processing, an annular wall section connected to the outer casing and extending inwardly inside of the air ducts, a conical barrier element formed with a lower skirt portion which is rigidly secured in spaced relation to the inner surface of the said casing to form an annular passageway through which the said articles of material may pass after entering the inlet opening, a vertically adjustable deflector element suspended from the apex of the conical barrier element in close proximity to the said inwardly extending annular wall section to form a variable restricted passageway adjacent to the air ducts, suction pipe means for inducing a flow of air into the outer casing through the said air ducts, said suction pipe being transversely mounted through the side of the casing and the barrier skirt and being formed with an inner open extremity which is curved upwardly to provide an elbow portion, said elbow portion terminating in close proximity to the apex of the conically shaped barrier element so as to constitute an aspirating orifice whereby particles of material carried upwardly by the flow of air into the restricted passageway move into the aspirating orifice and along an upwardly reversing path of travel with relatively coarser particles being rejected by the conical deflector and restricted passageway, and both the said deflector element and the suction pipe being vertically adjustable relative to the conical barrier element.

References Cited by the Examiner

UNITED STATES PATENTS

| | | | |
|---|---|---|---|
| 880,161 | 2/1908 | Osborne | 209—150 X |
| 1,445,760 | 2/1923 | Drake | 209—150 |
| 2,649,962 | 8/1953 | Ruemelin | 209—150 X |
| 2,866,547 | 12/1958 | Gladfelter | 209—135 X |
| 3,036,708 | 5/1962 | Freeman | 209—134 |

FRANK W. LUTTER, *Primary Examiner.*